US012184008B2

(12) United States Patent
Bae

(10) Patent No.: US 12,184,008 B2
(45) Date of Patent: Dec. 31, 2024

(54) CONNECTOR ASSEMBLY

(71) Applicant: Tyco Electronics AMP Korea Co., Ltd., Gyeongsan (KR)

(72) Inventor: Jae Yong Bae, Gyeongsan-Si (KR)

(73) Assignee: Tyco Electronics AMP Korea Co., Ltd., Gyeongsan (KR)

( * ) Notice: Subject to any disclaimer, the term of this patent is extended or adjusted under 35 U.S.C. 154(b) by 433 days.

(21) Appl. No.: 17/725,390

(22) Filed: Apr. 20, 2022

(65) Prior Publication Data

US 2022/0337000 A1 Oct. 20, 2022

(30) Foreign Application Priority Data

Apr. 20, 2021 (KR) ........................ 10-2021-0050839
Mar. 4, 2022 (KR) ........................ 10-2022-0028093

(51) Int. Cl.
*H01R 13/00* (2006.01)
*H01R 13/26* (2006.01)
*H01R 13/629* (2006.01)

(52) U.S. Cl.
CPC ........... *H01R 13/629* (2013.01); *H01R 13/26* (2013.01)

(58) Field of Classification Search
CPC ... H01R 13/629; H01R 13/26; H01R 13/5202
See application file for complete search history.

(56) References Cited

U.S. PATENT DOCUMENTS

| | | | | | |
|---|---|---|---|---|---|
| 4,027,937 | A * | 6/1977 | Norden | H01R 13/743 | 439/376 |
| 4,508,404 | A * | 4/1985 | Frawley | H01R 13/629 | 439/153 |
| 7,326,074 | B1 * | 2/2008 | Lim | H01R 13/629 | 439/352 |
| 2002/0098733 | A1 * | 7/2002 | Okamura | H01R 12/772 | 439/483 |
| 2010/0273351 | A1 * | 10/2010 | Holliday | H01R 24/40 | 439/584 |
| 2018/0034178 | A1 * | 2/2018 | Tyler | H01R 13/62977 | |
| 2022/0393398 | A1 * | 12/2022 | Okano | G03B 17/566 | |

* cited by examiner

*Primary Examiner* — Phuong Chi Thi Nguyen
(74) *Attorney, Agent, or Firm* — Barley Snyder

(57) ABSTRACT

A connector assembly includes a first connector having a connector cover, a head guide formed on the connector cover, an arm guide connected to the connector cover, a first connector body connected to the arm guide, and a connector lever connected to the first connector body. A second connector is slidable along the first connector body and engageable to the connector lever. A slider is slidable along the head guide and the arm guide, and a position of the slider changes by being pressed by the second connector. The slider presses and deforms the connector lever. The connector assembly further includes an elastic body disposed on the arm guide and supporting the slider.

18 Claims, 10 Drawing Sheets

CONNECTOR ASSEMBLY

CROSS-REFERENCE TO RELATED APPLICATIONS

This application claims the benefit of the filing date under 35 U.S.C. § 119(a)-(d) of Korean Patent Application No. 10-2021-0050839, filed on Apr. 20, 2021, and Korean Patent Application No. 10-2022-0028093, filed on Mar. 4, 2022.

FIELD OF THE INVENTION

The present invention relates to a connector assembly.

BACKGROUND

A connector is a kind of electrical component capable of connecting or disconnecting an electrical connection. The connector is used in various electromechanical devices, such as automobiles or household appliances, and is used for electrical and/or physical connection between a plurality of electronic components.

Technologies for preventing damage to a connection terminal by assisting in an alignment of the connection terminal of the connector are required. In addition, technologies for manufacturing the connector to have a compact size are required.

The background art described above is possessed or acquired by the inventor in a process of deriving the present disclosure; the background art is not necessarily a known technique disclosed to the public prior to the present application.

SUMMARY

A connector assembly includes a first connector having a connector cover, a head guide formed on the connector cover, an arm guide connected to the connector cover, a first connector body connected to the arm guide, and a connector lever connected to the first connector body. A second connector is slidable along the first connector body and engageable to the connector lever. A slider is slidable along the head guide and the arm guide, and a position of the slider changes by being pressed by the second connector. The slider presses and deforms the connector lever. The connector assembly further includes an elastic body disposed on the arm guide and supporting the slider.

BRIEF DESCRIPTION OF THE DRAWINGS

These and/or other aspects, features, and advantages of the invention will become apparent and more readily appreciated from the following description of example embodiments, taken in conjunction with the accompanying drawings, of which.

DETAILED DESCRIPTION OF THE EMBODIMENTS

Figure 1:
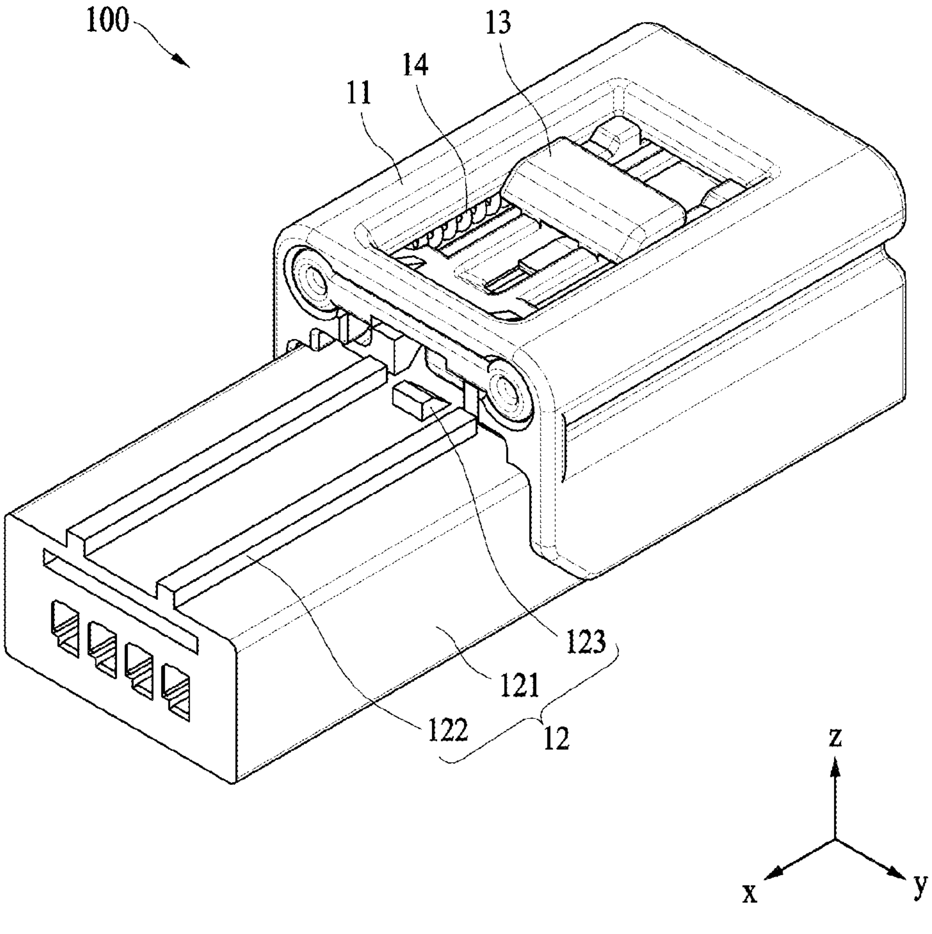
FIG. 1 is a perspective view of a connector assembly according to an embodiment before assembly.

The following structural or functional descriptions of example embodiments described herein are merely intended for the purpose of describing the example embodiments and may be implemented in various forms. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still a further component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted. The same name may be used to describe an element included in the example embodiments and an element having a common function.

Figure 2:
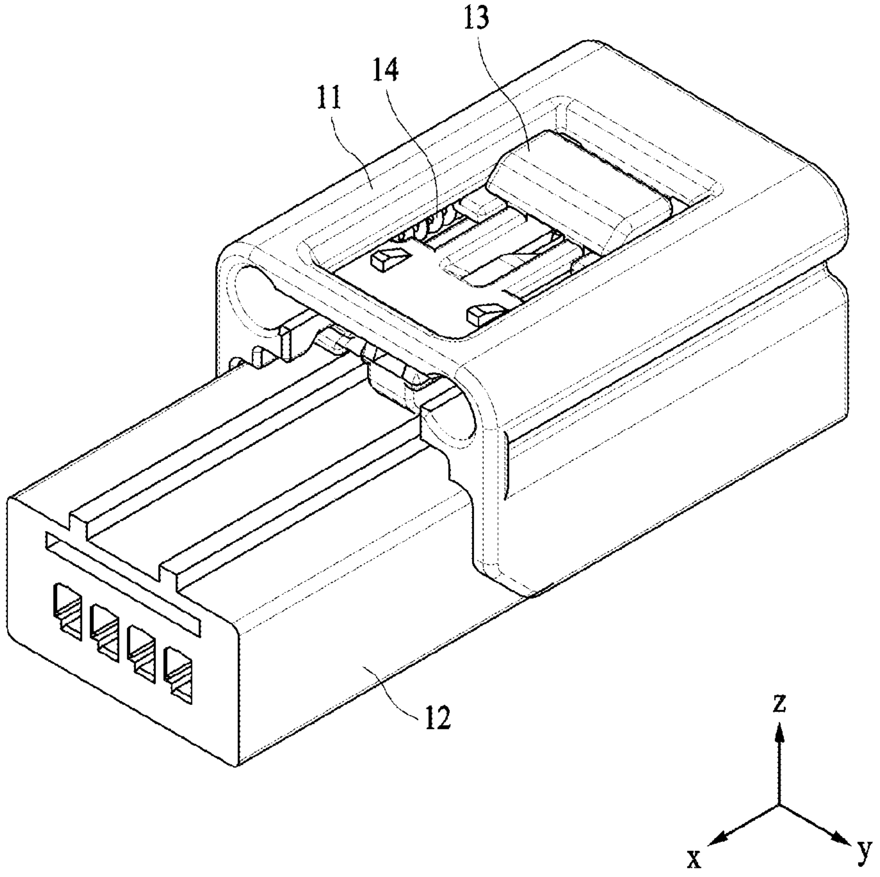
FIG. 2 is a perspective view of the connector assembly during assembly with a slider temporarily retreated backward.

Referring to FIGS. 1 and 2, a connector assembly 100 may include a first connector 11 and a second connector 12 that are slidably connected to each other, a slider 13 provided to be slidable with respect to the first connector 11, and an elastic body 14 disposed on the first connector 11 and supporting the slider 13. The connector assembly 100 may have a compact structure by including the first connector 11 capable of interfering with the second connector 12 and the slider 13 at the same time. Hereinafter, in the present disclosure, "upward" refers to a +z direction, and "downward" refers to a −z direction. "Frontward" refers to a +x direction, and "backward" refers to a −x direction.

The first connector 11 may movably accommodate the second connector 12 and the slider 13. For example, the second connector 12 and the slider 13 are movable relative to the first connector 11 along an x-axis direction. For example, a user may push in the second connector 12 in the −x direction in a state in which the first connector 11 is fixed.

The second connector 12 is slidable relative to the first connector 11. The second connector 12 may press the slider 13. When the user pushes in the second connector 12 in the −x direction in a state in which the first connector 11 is fixed, the slider 13 may be pressed by the second connector 12 to move backward. While the slider 13 moves backward, the elastic body 14 may be contracted and compressively deformed.

The second connector 12 may include a second connector body 121 accommodated in the first connector 11, a second connector rib 122 protruding upward from the second connector body 121, and a second connector protrusion 123 protruding upward from the connector body 121 and provided at a position spaced apart from the second connector rib 122, as shown in FIG. 1. A length direction of the second connector rib 122 may be provided in the x-axis direction. A pair of second connector ribs 122 may be provided spaced apart from each other in a y-axis direction. The second connector protrusion 123 may be positioned between the pair of second connector ribs 122.

The slider 13 is slidable relative to the first connector 11. When the slider 13 is pressed by the second connector 12 and moves backward by a predetermined distance or more, as shown in FIG. 2, the slider 13 may additionally interfere with the first connector 11. When the slider 13 interferes with the first connector 11, at least a portion of the slider 13 may be deformed, and an engaging state of the slider 13 with respect to the second connector 12 may be released. For example, the slider 13 may be pressed by the second connector rib 122 to move backward. While the slider 13 moves backward, a portion of the slider 13 that interferes with the second connector rib 122 may be pressed by the first connector 11 to be deformed. When at least a portion of the slider 13 is deformed, a portion of the slider 13 that interferes with the second connector rib 122 may move upward, and an interference state with the second connector rib 122 may be released. For example, when at least a portion of the slider 13 is deformed, a portion of the slider 13 that interferes with the second connector rib 122 may be positioned on an upper side of the second connector rib 122.

The elastic body 14 may be restored when the interference state between the second connector 12 and the slider 13 is released. When the elastic body 14 is restored, the slider 13 may move forward. While the slider 13 moves forward, the connector lever may pass through the second connector protrusion 123.

Figure 3:
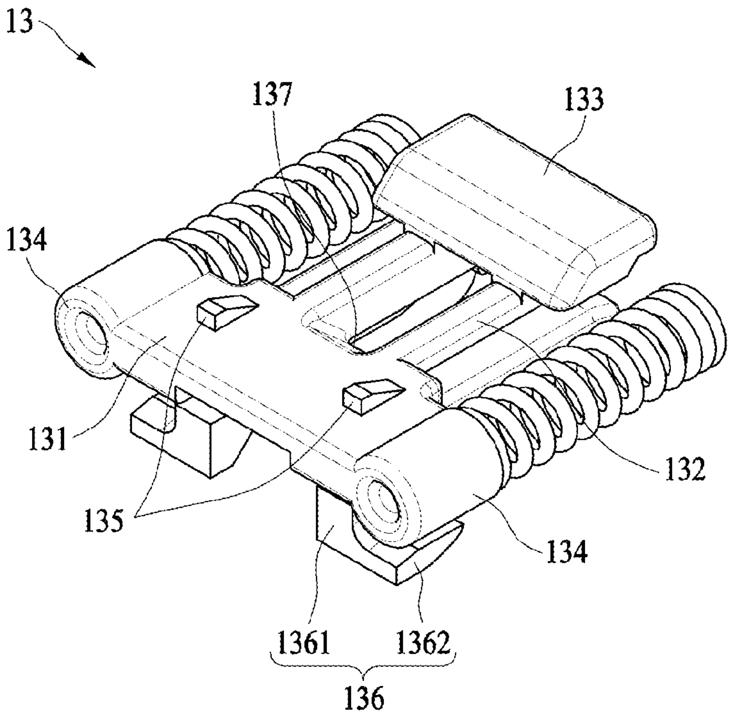
FIG. 3 is a perspective view of a slider according to an embodiment.

Referring to FIG. 3, the slider 13 includes a slider body 131, a slider base 132 extending from the slider body 131, a slider head 133 connected to the slider base 132, a slider arm 134 connected to the slider body 131, a slider protrusion 135 protruding upward from the slider body 131, a slider leg 136 connected to the slider base 132, and a slider interference part 137 protruding from the slider body 131.

Figure 4:
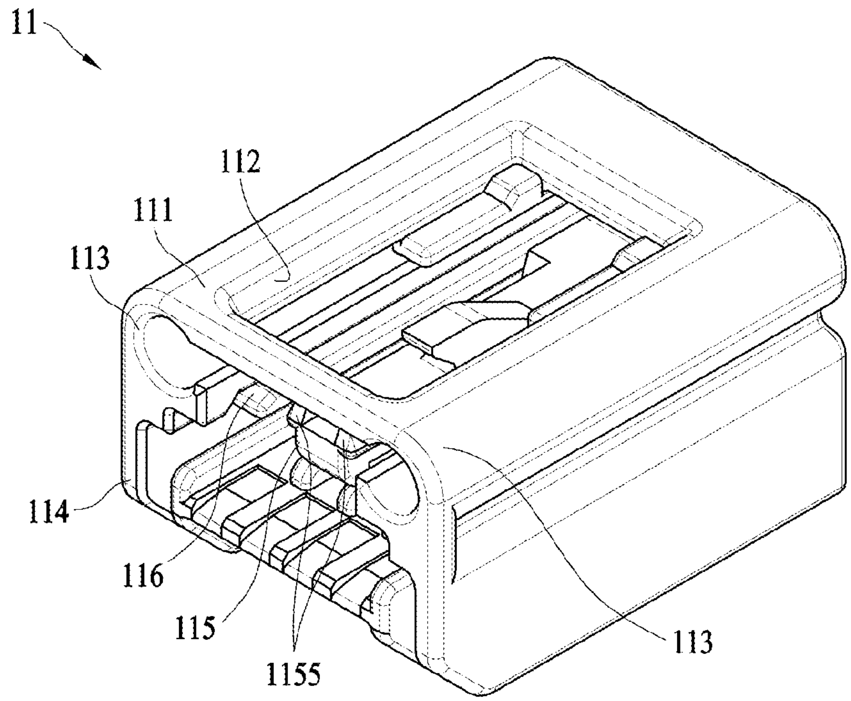
FIG. 4 is a perspective view of a first connector according to an embodiment.

The first connector 11, as shown in FIG. 4, may include a connector cover 111, a head guide 112 formed on the connector cover 111, a pair of arm guides 113 connected to the connector cover 111, a first connector body 114 connected to the arm guides 113, a connector lever 115 connected to the first connector body 114, and a leg guide 116 protruding from an inner side surface of the connector body 114.

The slider body 131 may be disposed within the first connector 11. The slider body 131 may have a plate shape.

The slider base 132 may be formed to extend backward from the slider body 131. The slider base 132 may have a rod shape, and a plurality of slider bases 132 may be provided.

The slider head 133 is connected to the slider base 132 and is slidable along the head guide 112. The slider head 133 may be provided in a state of being surrounded by the connector cover 111. The user may manipulate the slider head 133 through a finger and the like. For example, the user may move the slider head 133 forward or backward. The slider head 133 is engageable to the connector cover 111. The slider head 133 may set a distance at which the slider 13 moves backward.

A pair of slider arms 134 may be provided on both sides of the slider body 131, as shown in FIG. 3. The slider arms 134 may have a column shape. The slider arms 134 may be supported by an elastic body. The elastic body may be disposed on the arm guides 113, and support the slider arms 134.

The slider protrusion 135 is engageable to the connector cover 111. The slider protrusion 135 may prevent the slider 13 from being separated from the first connector 11. The slider protrusion 135 and the slider head 133 may set a distance at which the slider 13 moves forward and backward.

The slider leg 136 may be connected to the slider base 132, and may interfere with the leg guide 116. For example, the slider leg 136 is pressed by the leg guide 116 such that a front end may move upward. For example, the slider leg 136 may be connected to the slider base 132 at a rear end, and a front end portion may be movable upward and downward with respect to the rear end. In a state in which no external force is applied to the slider leg 136, the slider leg 136 is engageable to the second connector rib 122 described with reference to FIG. 1. When an external force is applied to the slider leg 136, the front end of the slider leg 136 may move upward, and the engaging state of the slider leg 136 and the second connector rib 122 may be released.

The slider leg 136 may include a leg body 1361 and a leg head 1362, as shown in FIG. 3. The leg body 1361 may be formed in parallel with the slider base 132. A rear end of the leg body 1361 may be connected to the slider base 132, and a front end of the leg body 1361 may be vertically spaced apart from the slider base 132. The leg body 1361 may be rotatable about a portion connected to the slider base 132. The leg body 1361 may interfere with the first connector 11 to be deformed. The leg head 1362 may outwardly protrude from an outer side surface of the leg body 1361. The leg head 1362 may directly contact and interfere with the first connector 11. A state of the leg head 1362 may be determined by a position of the slider 13 with respect to the first connector 11. For example, when the slider 13 is positioned relatively forward, the leg head 1362 may be provided at a position spaced apart from the leg guide 116 in the forward direction. For example, when the slider 13 is positioned relatively backward, the leg head 1362 may be positioned on an upper side of the leg guide 116.

The slider interference part 137 may protrude backward from the slider body 131. The slider interference part 137 is engageable to the connector lever 115. While the slider interference part 137 moves backward, the slider interference part 137 may press the connector lever 115 to rotate the connector lever 115.

The connector cover 111 may accommodate the slider head 133.

The head guide 112 may penetrate the connector cover 111. The slider head 133 is movable along the head guide 112. The head guide 112 may form a shape of a closed curve. According to such a shape, the connector cover 111 may have a ring shape, and the connector cover 111 may surround the slider head 133.

A pair of arm guides 113 may be provided on both sides of the connector cover 111. The arm guides 113 may guide a sliding of the slider arm 134.

The first connector body 114 may be connected to the arm guide 113.

The connector lever 115 may be connected to a rear end of the first connector body 114. The connector lever 115 may include a lever protrusion 1155 protruding upward from a front end, as shown in FIG. 4. In other words, the lever protrusion 1155 may protrude in a direction toward a lower surface of the slider body 131.

The leg guide 116 may protrude from an inner side surface of the connector lever 115. The leg guide 116 may interfere with the slider leg 136.

Figure 5A:
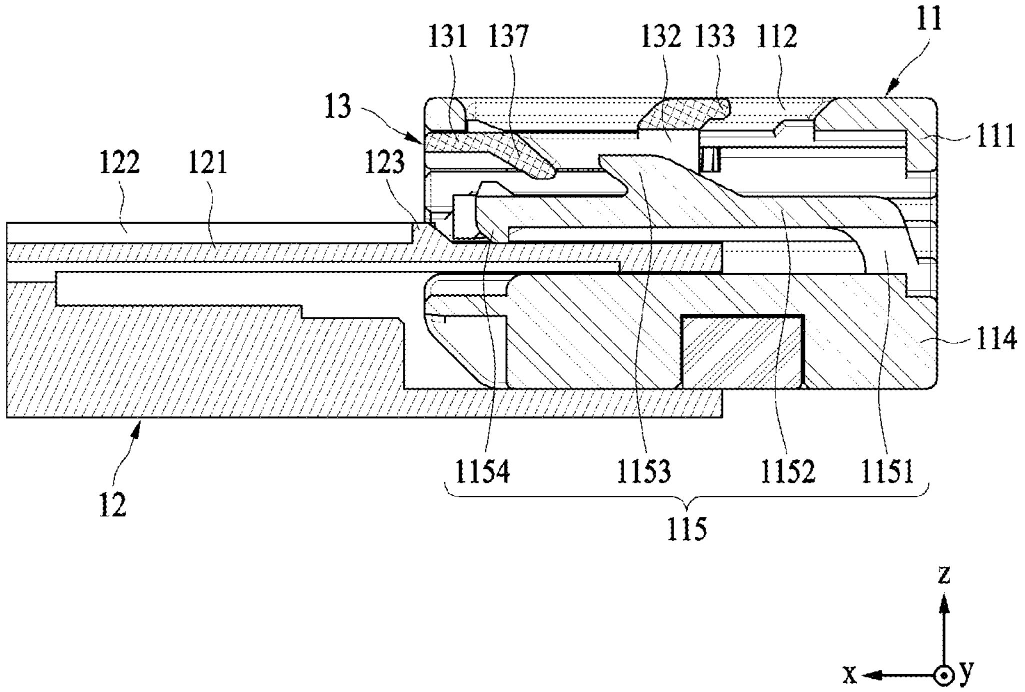
FIG. 5A is a sectional side view of a connector lever in a state before the connector assembly is assembled.
Figure 5B:
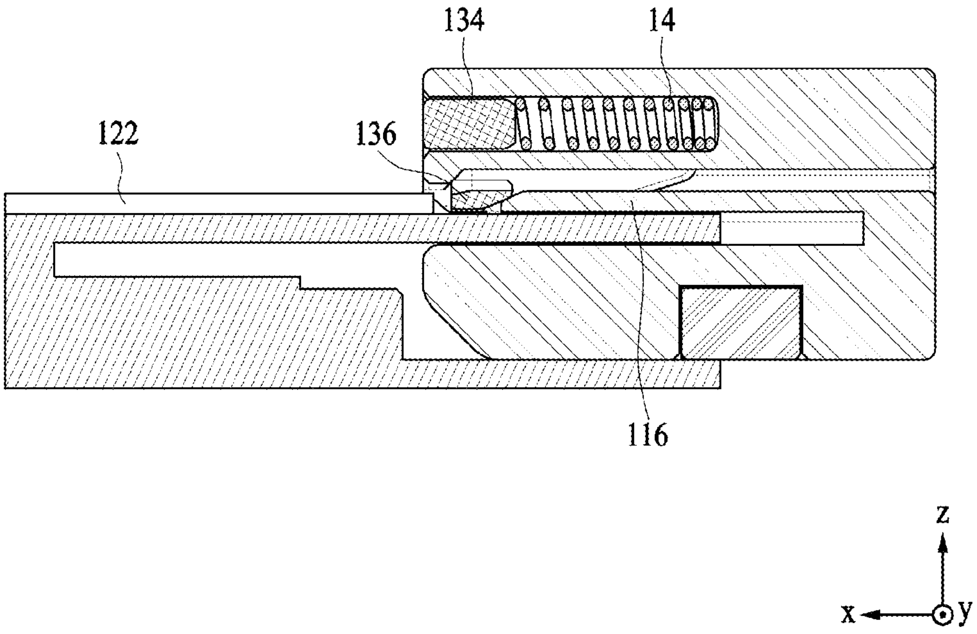
FIG. 5B is a sectional side view of a slider leg guide in the state before the connector assembly is assembled.

Referring to FIGS. 5A and 5B, a connector assembly may include the first connector 11, the second connector 12, the slider 13, and the elastic body 14. The second connector 12 may include the second connector body 121 slidable along the first connector 11, the second connector rib 122 protruding from the second connector body 121 and engageable to the slider leg 136, and the second connector protrusion 123 provided at a position engageable to the connector lever 115. In a state before the first connector 11 and the second connector 12 are assembled, the second connector protrusion 123 and the connector lever 115 may be provided to be spaced apart from each other in an x-axis direction. As shown in FIG. 5A.

The connector lever 115 may include a lever base 1151 connected to the connector body 114, a lever body 1152 extending from the lever base 1151 in the x-axis direction, a lever interference part 1153 protruding upward from the lever body 1152, and a lever head 1154 protruding downward from a front end of the lever body 1152. The lever interference part 1153 may protrude from the lever body 1152 in a direction toward the head guide 112.

The slider interference part 137 may be provided at a position spaced forward from the lever interference part 1153. In a state before the connector assembly is assembled, the slider leg 136 may be positioned in front of the leg guide 116, as shown in FIG. 5B. For example, the slider leg 136 may not be deformed by the leg guide 116.

The lever interference part 1153 and the lever head 1154 may be positioned in the same direction with respect to the lever base 1151, as shown in FIG. 5A. The lever interference part 1153 and the lever head 1154 may be positioned forward with respect to the lever base 1151. The lever interference part 1153, which is a portion that interferes with the slider 13, and the lever head 1154, which is a portion that is engageable to the second connector protrusion 123, may be positioned in the same direction with respect to the lever base 1151. According to such a structure, a configuration of a separate connector lever 115 may not be provided at the back of the lever base 1151, and the first connector 11 may have a compact structure.

The connector lever 115 may have a shape extending in a first direction based on a portion connected to the connector body 114. In other words, the connector lever 115 may have a shape extending in the first direction with respect to its rotation center. According to such a structure, a phenomenon in which at least a portion of the connector lever 115 is exposed to an outside of the first connector 11 or exposed upward the first connector 11 may be prevented. For example, an existing connector lever structure is a type of a lever structure in which a front end may form a portion coupled to the second connector 12 based on a point of action, and a rear end may protrude outside of the first connector 11 such that an operator applies an external force to release the coupling of the front end. Here, the point of action refers to a portion serving as the center of deformation of the connector lever structure. According to a related art, at least a portion of the first connector 11 is exposed such that the external force for releasing the coupling is applied on the connector lever 115. In this case, at least a portion of the connector lever structure may protrude or be exposed to outside of the first connector 11, and an unintended impact may be applied to the connector lever structure. When the unintended impact is applied to the connector lever structure, a phenomenon in which the connector lever is unintentionally operated may occur. When the connector lever is unintentionally operated, there may be a possibility that the connector assembly 100 is unintentionally separated. Further, if the connector lever structure has a shape extending in both directions about the point of action, when a double locking structure is applied, a space in which a front end of the connector lever structure is movable is not enough, so there may be a possibility that the connector lever structure may be broken.

The connector lever 115 positions a lever interference part 1153 corresponding to a portion that interferes with the slider 13 and a lever head 1154 engageable to the second connector 12 in the same direction from the lever base 1151, thereby preventing the connector lever 115 from being applied by the unintended impact. More specifically, the connector lever 115 is not configured as the existing lever structure, and is configured such that the point of action of the connector lever 115 is formed at one end, and respective positions at which the engagement structure with a counterpart connector and the external force are applied are formed at the other end of the connector lever 115, and thus, the coupling structure of the connector lever 115 and the second connector 12 may be released by the interference with the slider 13.

The connector cover 111 may cover the lever base 1151, as shown in FIG. 5A. For example, the connector cover 111 may stably protect the lever base 1151 such that the intended impact is not applied to the lever base 1151.

Figure 6A:
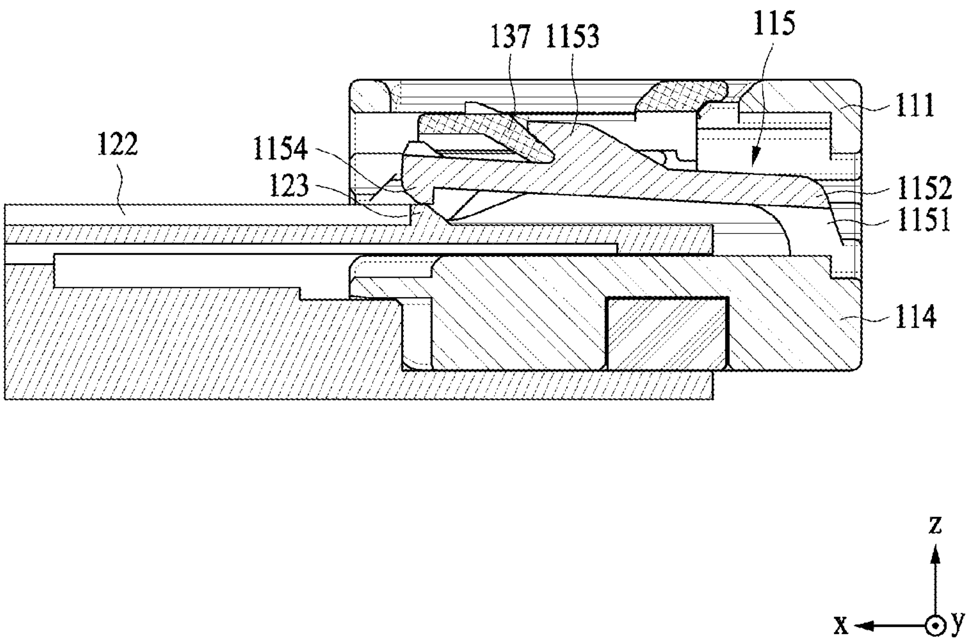
FIG. 6A is a sectional side view of the connector lever in a state in which the connector lever and a slider interference part interfere.
Figure 6B:
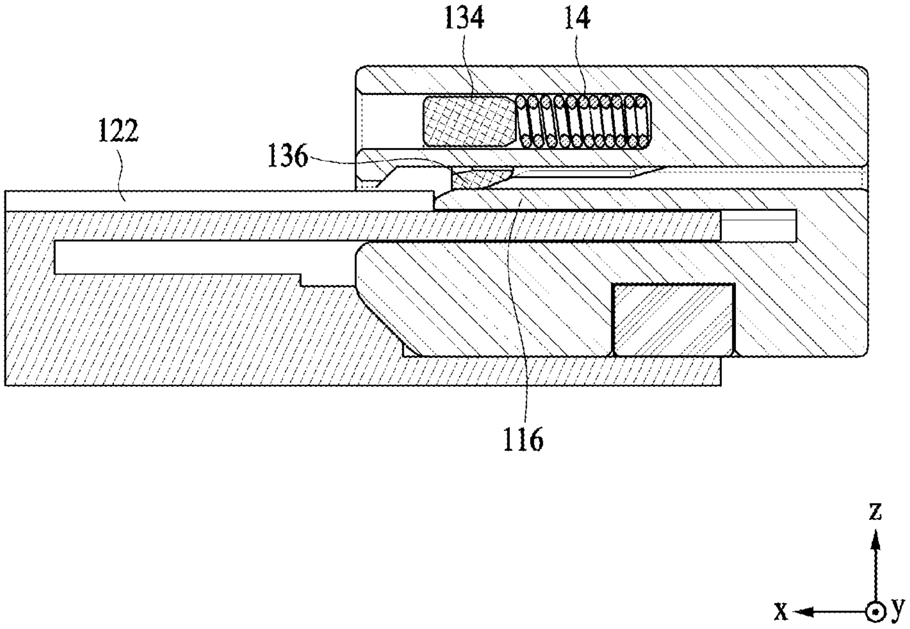
FIG. 6B is a sectional side view of the slider leg guide in the state in which the connector lever and the slider interference part interfere.

Referring to FIGS. 6A and 6B, while the second connector 12 slides into the first connector 11, the second connector rib 122 may press the slider 13 backward. While the slider 13 moves backward, the slider interference part 137 may press the lever interference part 1153 in the −x direction. The connector lever 115 may be deformed about the lever base 1151. For example, the lever body 1152 may rotate clockwise about the lever base 1151, as shown in FIG. 6A.

In addition, when the slider 13 moves backward by a predetermined distance or more, the slider leg 136 may be deformed upward by the leg guide 116. For example, FIG. 6B illustrates a state in which the slider leg 136 interferes with the leg guide 116, and is positioned on an upper side of the leg guide 116. For example, a front end of the slider leg 136 may move upward over the leg guide 116. The lever head 1154 may move upward over the second connector protrusion 123.

In a state in which the slider leg 136 completely moves upward over the leg guide 116, an interference state of the second connector rib 122 and the slider leg 136 may be released. In this case, the slider 13 including the slider leg 136 may move forward again by a restoring force of the elastic body 14. FIG. 6B illustrates a state immediately before the slider 13 moves forward. Even though the slider 13 moves forward to release the interference from the leg guide 116, the slider leg 136 may be positioned on the upper side of the second connector rib 122.

Figure 7A:
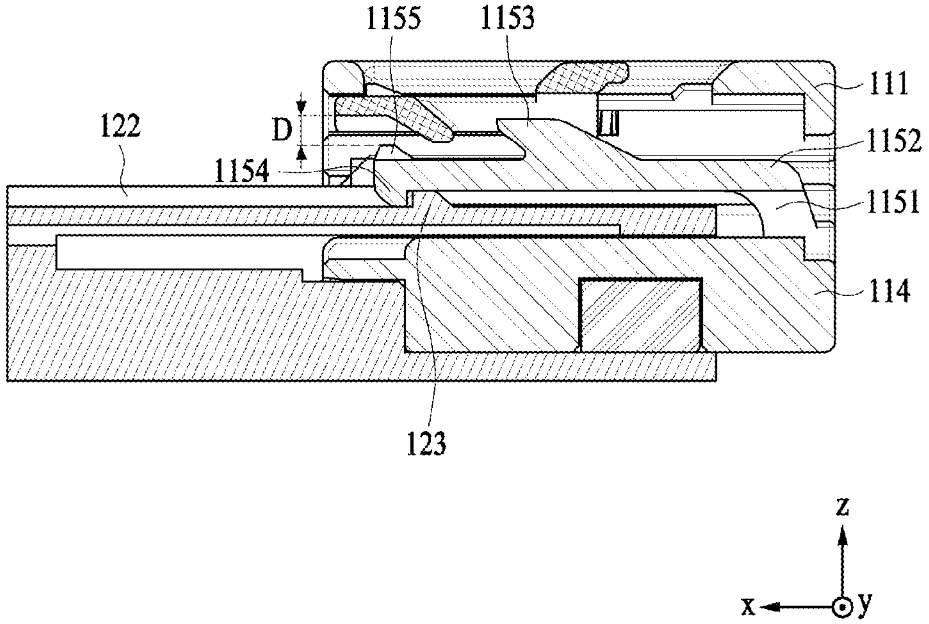
FIG. 7A is a sectional side view of the connector lever in a state in which the connector assembly is fully assembled.
Figure 7B:
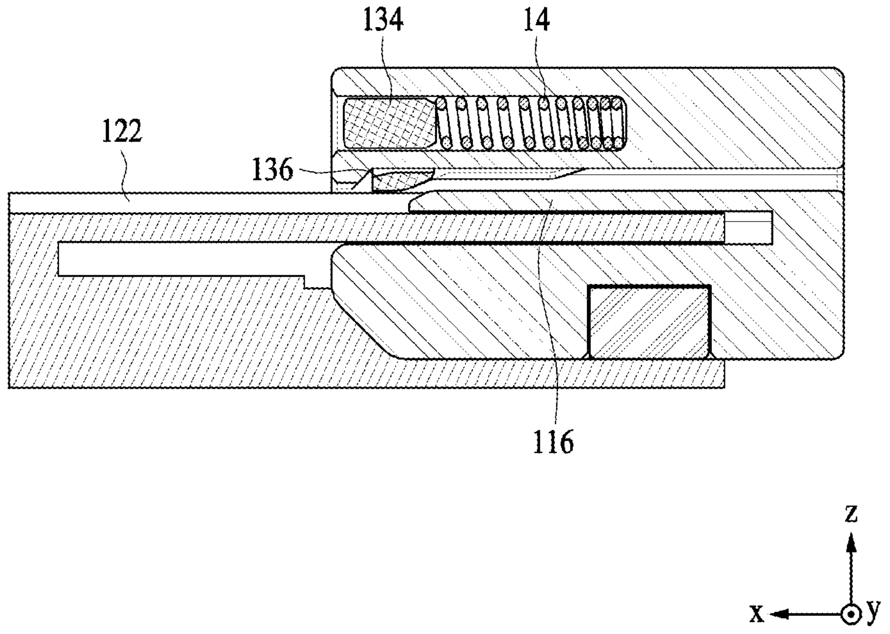
FIG. 7B is a sectional side view of the slider leg guide in the state in which the connector assembly is fully assembled.

Referring to FIGS. 7A and 7B, when a front end of the slider leg 136 is positioned on an upper side of the second connector rib 122, the engagement state of the slider leg 136 and the second connector rib 122 may be released, the elastic body 14 may press the slider arm 134 while being restored to its original shape. The slider 13 may move relatively forward with respect to the first connector 11.

The interference state of the slider 13 and lever interference part 1153 may be released. The connector lever 115 may be restored to its original shape by rotating counterclockwise about the lever base 1151. The lever head 1154 may be positioned in front of the second connector protrusion 123, as shown in FIG. 7A. In this case, the first connector 11 and the second connector 12 may be in an assembled state.

The user may simply separate the first connector 11 and the second connector 12 by an operation of retreating the slider 13 relatively backward with respect to the first connector 11.

The connector lever 115 may include a lever protrusion 1155 protruding upward from a front end. The lever protrusion 1155 may decrease a vertical distance D between the slider 13 and the connector lever 115, near the front end of the connector lever 115. The lever protrusion 1155 decreases the vertical distance D, thereby preventing the connector lever 115 from being unintentionally separated. For example, since the lever protrusion 1155 is engaged to the slider 13 before the slider 13 moves backward, a phenomenon in which the connector lever 115 and the second connector 12 are separated may be prevented.

Specifically, when the user retreats the slider 13 backward, the slider 13 may press the lever interference part 1153 to deform the connector lever 115. When the connector lever 115 is deformed, the engaging state of the lever head 1153 and the second connector protrusion 123 may be released. As the slider moves backward, the engaging state of the lever head 1153 and the second connector protrusion 123 is released at the same time. This avoids the inconvenience in existing connectors having a double locking structure in which both operations of pressing the connector lever in the downward direction, while moving the slider in the backward direction are performed separately, however, the present invention may easily separate the connector assembly only by an operation of pushing the slider 13 without a separate operation for the user to manipulate the connector lever 115.

While example embodiments have been described with reference to limited drawings, one of ordinary skill in the art may apply various technical changes and modifications based on the disclosure. Suitable results may be achieved if the described techniques are performed in a different order, and/or if components in a described system, architecture, device, or circuit are combined in a different manner and/or replaced or supplemented by other components or their equivalents. Therefore, other implementations, other embodiments, and equivalents to claims fall within the scope of the appended claims.

What is claimed is:

1. A connector assembly, comprising:

a first connector having a connector cover, a head guide formed on the connector cover, an arm guide connected to the connector cover, a first connector body connected to the arm guide, and a connector lever connected to the first connector body;

a second connector slidable along the first connector body and engageable to the connector lever;

a slider slidable along the head guide and the arm guide, a position of the slider changes by being pressed by the second connector, the slider presses and deforms the connector lever; and an elastic body disposed on the arm guide and supporting the slider.

2. The connector assembly of claim 1, wherein the connector lever extends from a portion connected to the first connector body in a first direction.

3. The connector assembly of claim 1, wherein, while the second connector moves relative to the first connector, the elastic body is compressively deformed and the slider interferes with the first connector to be deformed in a direction spaced apart from the second connector.

4. The connector assembly of claim 3, wherein, when the slider is spaced apart from the second connector by a predetermined distance or more, a state in which the second connector presses the slider is released, and the elastic body is restored to an original shape.

5. The connector assembly of claim 1, wherein the connector lever has a lever base connected to the first connector body, a lever body extending from the lever base in a first direction, and a lever head protruding from the lever body, the lever head is engageable to the second connector.

6. The connector assembly of claim 5, wherein the lever body is provided within the first connector.

7. The connector assembly of claim 5, wherein the connector cover covers the lever base.

8. The connector assembly of claim 5, wherein the connector lever has a lever interference part protruding from the lever body in a direction toward the head guide, the lever interference part interfering with the slider.

9. The connector assembly of claim 8, wherein the lever interference part and the lever head are positioned in a same direction with respect to the lever base.

10. The connector assembly of claim 1, wherein the slider has a slider body disposed within the first connector, a slider base extending from the slider body, and a slider head connected to the slider base, the slider head is slidable along the head guide.

11. The connector assembly of claim 10, wherein the connector cover has a shape surrounding the slider head.

12. The connector assembly of claim 10, wherein the slider has a slider interference part protruding from the slider body, the slider interference part presses and deforms the connector lever.

13. The connector assembly of claim 12, wherein the slider has a slider leg connected to the slider base and interfering with the first connector.

14. The connector assembly of claim 9, wherein the slider has a slider protrusion protruding from the slider body, the slider protrusion is engageable to the connector cover.

15. A connector assembly, comprising:

a first connector having a connector cover, a head guide formed on the connector cover, an arm guide connected to the connector cover, a first connector body connected to the arm guide, and a connector lever connected to the first connector body;

a slider having a slider body disposed within the first connector, a slider base extending from the slider body, a slider head connected to the slider base and slidable along the head guide, a slider arm connected to the slider body and slidable along the arm guide, and a slider interference part protruding from the slider body, the slider interference part presses and deforms the connector lever; and an elastic body disposed on the arm guide and supporting the slider arm.

16. The connector assembly of claim 15, wherein the connector lever has a lever base connected to the first connector body, a lever body extending from the lever base, and a lever head protruding from the lever body.

17. The connector assembly of claim 15, wherein the first connector has a leg guide protruding from an inner side surface of the first connector body.

18. The connector assembly of claim 17, wherein the slider has a slider leg connected to the slider base and interfering with the leg guide.

* * * * *